(12) United States Patent
Bennett

(10) Patent No.: US 9,509,713 B2
(45) Date of Patent: *Nov. 29, 2016

(54) BROWSING SUPPORT INFRASTRUCTURE WITH TIERED MALWARE SUPPORT

(71) Applicant: RPX CORPORATION, San Francisco, CA (US)

(72) Inventor: James D. Bennett, Hroznetin (CZ)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,322

(22) Filed: Sep. 15, 2014

(65) Prior Publication Data

US 2015/0007329 A1 Jan. 1, 2015

Related U.S. Application Data

(63) Continuation of application No. 12/372,413, filed on Feb. 17, 2009, now Pat. No. 8,839,431, and a continuation of application No. 13/662,765, filed on Oct. 29, 2012, now abandoned.

(60) Provisional application No. 61/052,521, filed on May 12, 2008.

(51) Int. Cl.
*H04L 29/06* (2006.01)
*G06F 21/51* (2013.01)
*G06F 21/56* (2013.01)

(52) U.S. Cl.
CPC ............. *H04L 63/145* (2013.01); *G06F 21/51* (2013.01); *G06F 21/562* (2013.01); *G06F 21/565* (2013.01); *G06F 21/568* (2013.01)

(58) Field of Classification Search
CPC .......... H04L 63/145; H04L 29/06918; G06F 21/562; G06F 21/568; G06F 21/51; G06F 21/565
See application file for complete search history.

(56) References Cited

U.S. PATENT DOCUMENTS

| | | | | |
|---|---|---|---|---|
| 7,299,361 B1* | 11/2007 | Kim et al. | | 713/188 |
| 7,840,763 B2* | 11/2010 | Murotake et al. | | 711/153 |
| 7,849,507 B1* | 12/2010 | Bloch et al. | | 726/22 |
| 2008/0222729 A1* | 9/2008 | Chen et al. | | 726/24 |
| 2009/0271842 A1* | 10/2009 | Baumhof | | 726/1 |

* cited by examiner

*Primary Examiner* — Tri Tran
(74) *Attorney, Agent, or Firm* — Howison & Arnott, LLP

(57) ABSTRACT

A network browser has a Malware detection manager for direct or indirect scanning of files during an upload or download processes for viruses, adware, spyware, etc. The malware detection manager defines and employs a quarantine bin, which is an isolated and secure memory space or directory for temporary placement of file packets during the file transmission while malware detection can commence. The malware detection manager scans for malware code associated with the packet sequence encountered during a file transmission to and from the Internet, during which it quarantines all the scanned packets in the quarantine bin. Quarantined files can be released if there is a human challenge authorizing the release of the file. Exchanging a Malware free signature between server and client via a trusted download center may be done so the client device need not scan the files for malware if content is certified and guaranteed as malware-free.

20 Claims, 11 Drawing Sheets

BROWSING SUPPORT INFRASTRUCTURE WITH TIERED MALWARE SUPPORT

CROSS REFERENCE TO PRIORITY APPLICATIONS

The present U.S. Utility Patent Application claims priority pursuant to 35 U.S.C. §120 as a continuation of U.S. Utility application Ser. No. 12/372,413, entitled "Network Browser Based Virus Detection," filed Feb. 17, 2009, issuing as U.S. Pat. No. 8,839,431, which claims priority pursuant to 35 U.S.C. §119(e) to U.S. Provisional Application No. 61/052,521, entitled "Network Browser Based Virus Detection," filed May 12, 2008. The present U.S. Utility Application also claims priority as a continuation of U.S. Utility application Ser. No. 13/662,765, entitled "Browsing Support Infrastructure with Tiered Malware Support," filed Oct. 29, 2012, which claims priority pursuant to 35 U.S.C. §120 as a continuation of U.S. Utility application Ser. No. 12/372,413, entitled "Network Browser Based Virus Detection," filed Feb. 17, 2009, issuing as U.S. Pat. No. 8,839,431, which claims priority pursuant to 35 U.S.C. §119(e) to U.S. Provisional Application No. 61/052,521, entitled "Network Browser Based Virus Detection," filed May 12, 2008, all of which are hereby incorporated herein by reference in their entirety and made part of the present U.S. Utility Patent Application for all purposes.

BACKGROUND

1. Technical Field

The present invention relates generally to browsing in an Internet infrastructure; and more particularly to a malware and viruses detection.

2. Related Art

The infiltration of viruses into computing devices over the Internet is a serious security threat. The virus code, herein called as malware code, comprises all type of malicious code targeted for damaging the file system of a computer and, in addition, negatively impact the performance of the computing devices and the speed of the Internet access. Some type of viruses replicate on their own and propagate causing flooding of packets on the net, thereby crippling an Internet service, or causing a denial of service problem.

Often, files are transferred between computers or downloaded from a server to a client device. Various file transfers to and from a client device may also take place from other peripheral devices connected directly to the client device and the client device. In both situations, there is a possibility of loss of files, system crash, network service degradation, etc., caused by viruses, Trojans, or other malware embedded in the files being transferred. The blocking of worms, adwares, spyware, etc., which constitutes the malware code, embedded in files that are transferred, is imperative for most computer users, but effective blocking of malware has always been a challenge.

Some browsers that are available in the market provide mechanisms to block "pop up ads," and associated spyware. Some browsers have "adware blocking software" integrated into their feature set, but these are often not fully effective to the extent required by most users. On the other hand, currently available conventional anti-virus software such as Norton, McAfee and others tools do exist. However, these anti-virus protection programs are not adequate or effective in blocking some malware codes that sneak into the system through various means.

In general, there are many software tools available for implementing security features via Internet servers and in client devices that are connected to them over an Internet backbone. The current features of virus detection tools available on these servers are inadequate in protecting the servers and the clients connected to them, especially taking into consideration the ever-increasing and changing security threats and mounting end-user access requirements. The typical virus detection tools that reside in the storage media of the servers, and in general, in all computing devices, scan for viruses based on certain preset scanning options, such as manual scan or periodic automatic scan. These virus detection tools can also repair, to some extent, the files damaged by virus infection. If the files are irreparable, they are sometimes quarantined and the user is notified.

Periodic virus scanning in a computer (such as a PC or a server), as is often conducted by virus scanning tools, is of limited use. Running the virus tool post facto on the computer storage to detect viruses and other malware is one of major drawback of the current virus tools. The infiltration of malware code into a computing device takes place during the file transfer from the internet or from the peripheral devices, and sometimes, the scanning for viruses after the file transfer has taken place it too little too late.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present embodiments and invention will become apparent from the following detailed description of the invention made with reference to the accompanying drawings.

DETAILED DESCRIPTION OF THE DRAWINGS

Figure 1:
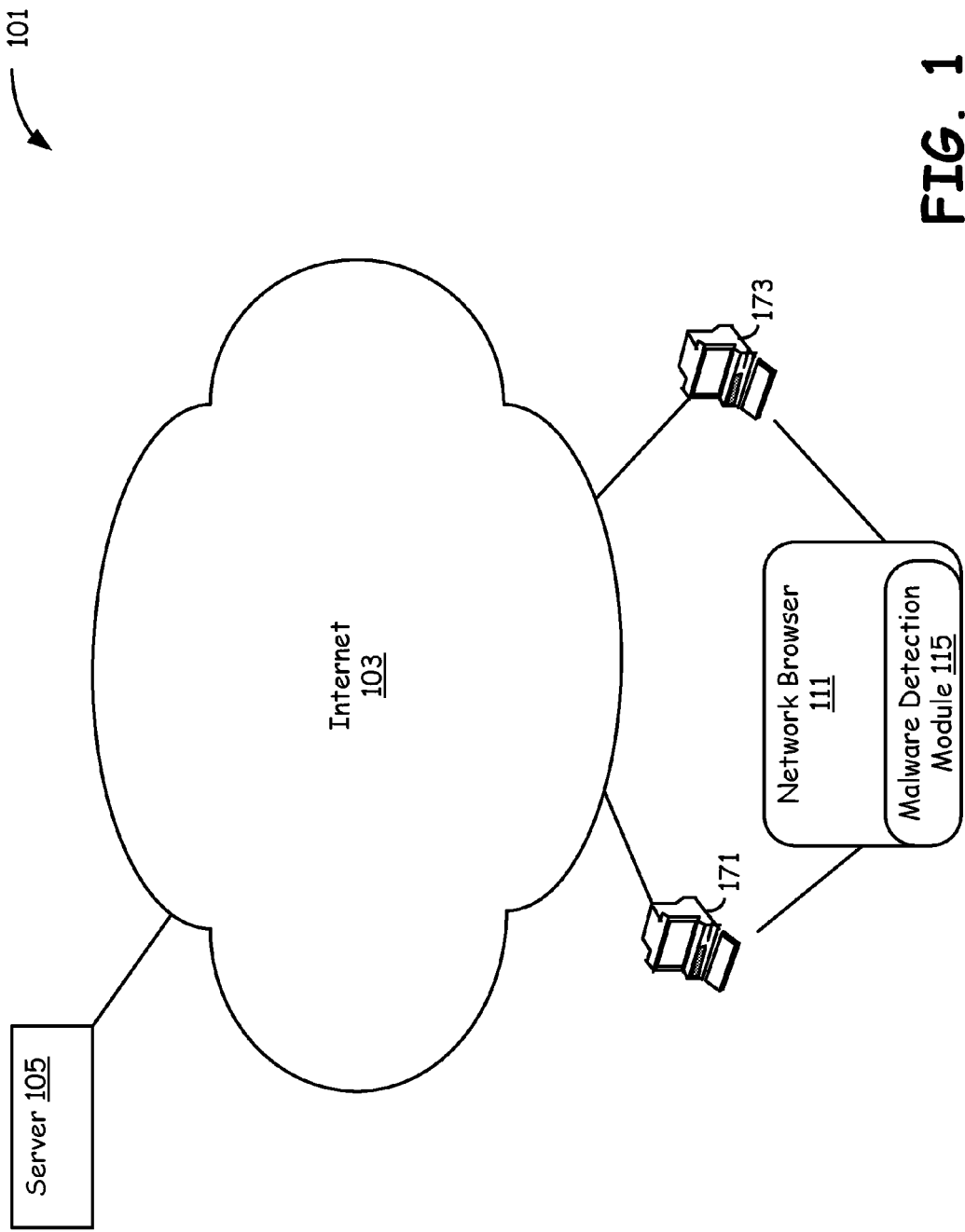
FIG. 1 is a perspective diagram of a network having a server and a plurality of clients, wherein the clients are communicatively coupled to the server over an Internet backbone, and wherein the clients comprise a malware detection module built into a network browser.

FIG. 1 is a perspective diagram of a network 101 having a server 105 and a plurality of clients 171-173, wherein the clients 171-173 are communicatively coupled to the server 105 over an Internet backbone and wherein the clients 171, 173 comprise a malware detection module 115 built into a network browser 111 which can comprise hardware and/or software components and functionality. The Internet backbone 103 communicatively couples the server 105 and the clients 171-173 while users of the clients 171-173 access information over the Internet 103, such as webpages and other content, provided by the server 105. It is important to note that FIG. 1 is greatly simplified and that many servers and client devices are coupled to the Internet or routinely coupled in intranets or networks.

In FIG. 1, the client devices 171-173 comprise the network browser 111 that enables the web browsing, uploading, and downloading of files, connection to web mail, etc. In other embodiments, the server 105 may contain the browser or some portion of it, especially when the client devices are dumb terminals, thin clients, or other similar devices. During Internet browsing, certain malware code may attempt to infiltrate into the clients 171-173 along with other desirable file packets or data, thereby putting the clients 171-173, server 105, and other computers on the Internet in danger. The malware code typically attempts to destroy files, impede functionality, slow performance, engage in unwanted computer activity, or harm the computing device. Some forms of malware code are viruses, spam, worms, executables, etc., that result in the junk traffic to and from your computer. Other forms of malware such as adware, spyware, etc., may not be directly harmful to a computer but are often unwelcome and unsolicited by a user or engage in unwanted activity or snooping on a computer, and therefore need to be blocked. Also, the form of a computer is constantly changing. Today, computers can take the form of televisions, set top boxes, game machines, servers, mobile devices, wireless routers, security devices, commercial equipment, appliances, automobile controllers, industrial controls, and any other number of functions, form factors, and uses. Therefore, the pervasive and extensive use of computers in many different devices and markets makes malware detection and prevention even more important, and sometimes more difficult.

FIG. 1 shows a malware-scanning module that is provided in the form of a network browser 111 that comprises the malware detection module 115. In accordance with the present invention, a malware detection module 115 built into the network browser makes it possible to automatically scan every packet sequence that is uploaded or downloaded to or from the computer or client device for the presence of malware code. The presence of malware code is detected employing one of several possible ways, such as detecting signatures of the malware in files. For example, if a certain sequence, pattern, or set of malware code bytes is detected during the uploading or downloading of files, the associated operation involving the malware code is stopped and the file downloaded is put in a quarantine bin. Thus, a browser uses a quarantine bin in a restricted directory on client storage for testing for malware before delivering the data to the browser and/or elsewhere in the client system storage.

Instead of quarantining the entire download if malware is detected, the quarantine might only be required on a certain packet, video frame, or data subset, performed on a packet-by-packet basis or in some other division. Such a selective or partial quarantining is useful in the situation where a malware component is embedded in a long string or data or media, such as a movie or a music download. Such a partial segregation or quarantining can allow a user to complete a large portion of the operation with only partial loss of content that may even go unnoticed by a user. However, in other cases or embodiments, the presence of malware code may indicate that the entire media (e.g., the entire download, movie, MP3 file, etc) is corrupt or suspect and should be quarantined from the system. Analysis also includes Java code inspected for malware characteristics; virus signatures; pop-up scripts, etc. The detection software can quarantine every download as it is received until it has concluded that the download is complete and safe. This includes all web page downloads as well, and in fact, anything that flows through the communication pathway can be isolated in a safe memory space isolated from certain critical hardware, software, and operating system (OS) space/access until it can be scanned and be determined to be safe. If a virus is detected, the download can continue in full with the contents of the full download being quarantined and never being released except with a human challenged authorization. In another embodiment of the present invention, on detecting the virus code, the download could be discontinued and the partially delivered file quarantined. Quarantine and delivery completion could restart, continue, or reoccur after human challenge authorization in special cases.

Similarly, the detection software can process every upload either analyzing the entire upload file in advance or the byte sequence as it is being transmitted from the client device. If a sequence, pattern, or set of data is confirmed as comprising a virus, the upload delivery will be prevented or terminated with a notification message to the user and possibly the recipient device(s); along with the quarantining or clean-up of the infected file on the client device. Upstream and downstream both may involve "human challenges", where if a human challenge is successful at one and/or both the receiving and transmitting side, the content may be sent once the challenges are confirmed whereby the operation, data, or download will be unlocked from quarantine and the delivery finished. Memory for the quarantine bin can be allocated interactively by the operating system using normal memory garbage collection routines and algorithms or the quarantine space can be set by prompting the user for the required number of bytes through a pop up window. Alternatively, the size and extent of isolation of the quarantine area may be set up in the control panel of a PC or a similar control construct within the client device. The quarantine space need not be fixed in size and level of isolation. In some cases, the performance of the system and/or the needs of the quarantine space can result in the quarantine space being dynamically adjusted up and down in size or up or down in the amount of isolation it is experiencing. In some cases, the quarantine space will contain content that needs to be kept from certain data or resources or be allowed to access certain data or resources to evaluate, detect, and/or possibly correct the malware influence. In these cases, the quarantine space level of isolation may be adjusted as the client device determines the risk or needs associated with certain access or lack thereof. In the case where the user can enter or influence the size of the quarantine space, the user can enter the required number of bytes, kilobytes, megabytes, gigabytes, etc., as per the requirement. This user-set size feature is helpful when the storage space is limited, in embedded or specialized systems, for an optimum utilization of the storage resources.

Accordingly, when the files are downloaded or uploaded as a sequence of packets, the tool caches and scans the packets coming in for all known malware code bytes while quarantining the files as required for security of the system until malware detection can complete. The files can be released from the quarantine bin upon two conditions; first, if the system determines that the packets are clean not infected by any malware, and second, upon a successful human challenge authorization if malware is believed to be found. The built-in malware detection manager that is found within the web browser also has the capability to analyze the authenticity signature that is affixed to each packets downloaded from a trusted site. Repeated downloads by several clients from such trusted sites save lot of scanning time for malware code by each clients because in certain cases the authentic signature allows the module 115 to streamline or bypass certain detection algorithms and processes with confidence that nothing is being missed or compromised. Executable, data, content, or other inputs and possible outputs to and from other peripherals connected to the client machines are also similarly scanned during each file read/write operations, processed through the quarantine bin, and cleared or isolated permanently the malware detection manager as required.

A reliable method for blocking malware code and corrupt data along with the ability to provide notice messages to affected machines or users is useful over the Intranet or other networks. This processing makes not only the computing devices free from malware, but the whole internet infrastructure free from malware on both the receive and transmit sides of the connection, and hence enhance network performance or services.

In one embodiment, the malware detection manager is built into the web browser itself. The files are scanned and permanently quarantined or repaired as possible during their transmission to or from the computing device before they are placed into fully accessible and functional memory or OS space of the recipient device. As a result, the malware code will not propagate to and from the computing devices. The mechanism of scanning and quarantining the incoming or outgoing packets real time into a quarantine bin during receipt and transmission allows malware to be detected, corrected, or eliminated before it is placed on a computer system in a place that can cause immediate damage or trouble. If the packets are free from any malware code bytes, they are released from the temporary quarantine to complete the transfer, otherwise that code/content is never released or a correction attempt is made before transmission is allowed to fully complete. In some cases, a human challenge authorization may release the file from the quarantine bin, if the user believes that the packets seem to be genuine. The quarantine bin is special directory set up for the purpose of security of the computing device in its storage area, and it may be possible to program the quarantine bin to allow human override in certain circumstances, especially if detection of the malware is uncertain or the malware is not likely to be of the type that causes serious damage or trouble with the client device or other devices on the Intranet.

The Malware Detection functionality described above may be described as a series of modules herein. In one embodiment, the modules comprise an MD (malware detection) Manager, one or a plurality of Comparison Agents (that may each be launched by the MD Manager to deal with an incoming file stream or file stream portion), and a single MD Database. Basically the MD Manager assigns to a Comparison Agent a file stream or file stream portion (e.g., when the file is big and an agent is or will be falling behind the amount of the file still in quarantine). Also, multiple comparison agents can be active on the same or a different stream of data at the same time, thereby allowing parallel processing or multi-CPU-core application to the task of malware detection as taught herein. The Comparison Agent performs the malware detection analysis through interaction with the common MD Database and by scanning the data stream(s). The MD Database not only stores known malware bit sequences, but also provides for more complex detection through MD logic that may supplement one of the known malware bit sequence entries. In another embodiment, the MD Database may launch a more complex comparison agent that can set up a virtual machine within the quarantine space with virtual access to system resources. In this safe and isolated "fake" environment, the MD Database may launch the downloaded content, executable, or data and monitor its progress. If the launched code engages in behavior that is detected to be a sign of malware (e.g., sending mass amounts of emails with bad content, inappropriately processing on the hard drive, etc., then the program can determine the presence of malware even if a bit detection sequence is missed or a new virus with a new bit pattern is generated. In other words, many different manners of detecting malware can be employed, from bit scanning to find viral or malware patterns that are known, or setting up a safe quarantines virtual machine and launching the application that is being downloaded and monitoring its performance for unexpected activity, or other means. However, most malware can be detected by matching a single bit sequence stored in a single MD Database entry to the downloaded data stream. However, some malware may require even more complex analysis defined by MD Logic stored in the MD Database than a simple single compare and verify operation. The logic, for example, may require that 4 malware bit sequences (stored in 4 MD Database entries) be found in a single file in a certain sequence, relationship, or locations before a conclusion that malware exists can be made. Thus, each MD Database is arranged to store MD Logic entries that each have one or more associated MD bit sequences entries. Each Comparison Agent retrieves and executes the MD Logic that instructs the Comparison Agent on how to process its comparisons using the particular associated MD bit sequences. Simple MD Logic will merely identify a substantially large number of associated MD bit sequences that, when a single match is found, a conclusion that malware exists, can be made. More complex MD Logic may require that a single file must match three separate bit sequences (MD bit sequences from the MD Database) in a single file. Another complex MD Logic entry may, for example, require "either a first MD bit sequence or a second MD bit sequence AND a third MD bit sequence subsequent thereto" must be found). These are just examples, there are other logically verification sequence that may be performed to detect the presence of certain malware, viruses, or other unwanted code/data/functions.

The quarantine and malware detection functionality are most likely integrated into the typical browser directly or through add-on functionality, such as through a software plug-in or expansion pack.

Malware detection could be running on quarantined items as they are received or may be processed only after the entire download occurs and is the entire content is placed into quarantined memory for malware processing. In one example, the quarantining would provide either a tagged file or folder that is locked/secure and cannot be displayed by the browser or executed by the browser or the host. The software in the tagged file or locked folder has no way to be operated on or gain access to anything other than the Malware Detection functionality, and has limited or no access to operating system (OS) calls or system peripherals or resources (Internet, hard drive, main memory, GPU card, etc). This can be accomplished using windows locking functionality, or potentially more effective, by applying a local, private key function (XOR) on anything downloaded before storage into the quarantine. Releasing from quarantine would involve application of the local key function in reverse, e.g., another XOR application of the local private key. Of course, in another embodiment as previously discussed, the tagged file or locked folder could be structured to appear like a normal PC or a virtual machine with OS access, peripheral access, application access, etc., where in reality, the system does not have such access. This virtual environment can be used as an executable test ground for downloaded content to detect harmful functionality even if a bit stream comparison or other algorithm fails to find a known virus. This virtual machine method of testing for malware is useful in detecting new viruses that may not have been processed to create MD bit sequence comparisons yet.

Malware Free Signatures may be created such that repeated visits to same unchanged sites do not require the same analysis over and over again. Such a trusted site may periodically authenticate the file system on the download center with a time stamp indicatively of last time that it got scanned for malware code and certify/guarantee that no new code or changes were made to the code since the last scan/check was conducted. Such signatures might be produced by a trusted and up-to-date source so that repeated analysis for the presence of the malware code by other users need not occur on code that was previously determined to be "malware free." Furthermore, codes, checksums, error detection/correction, signature analyzers, linear feedback shift register processing, and similar methods may be used to verify that the code has not been changed since its last malware scan, thereby ensuring that covert changes in the code without the author or owners knowledge cannot occur within the code/system. With such an approach, a web page or download might be delivered with an accompanying guaranteed signature from the trusted download center to be free of any malware, i.e., with a signature from the trusted source with every packet. And, the checksum, codes, etc that can verify it was not contaminated in transit can also be passed on in a secure manner to ensure that what was send and free of malware was actually received in the same state and not contaminated along the transmission path. With several clients visiting such trusted site and not having to scan the packet/data, there is a significant savings on scan time/processing in accordance with this embodiment. And, this approach is simple to execute to the point of ensuring that malware free code has been provided by checking each packet for the signature, checksum, etc., with an appropriate encrypted validation code or time stamp. Even if the requirement is met in terms of the level of authenticity and the time last scanned, the client device may still decide to rescan the downloaded data for confirmation of the lack of malware or proceed with the send/receive operation without doing such additional scanning.

In one embodiment, any download process is initiated with a signal. This signal is initiated or issued in response to the user in the web browser window entering the name of the site to be visited for download, or via the user clicking or initiating a download operation. Subsequently, the user may browse to a download center, check for trustworthiness of the center in terms of the authenticity signature, proceed to download, engage in authentication of the download for malware-free indications, and if not authenticated then perform malware scanning as taught herein. During the scanning process, the downloaded packets are compared with the known virus/malware code and code patterns/sequences. If malware code detected, the file is quarantined and the download is stopped with a notification to the user(s). A file that they malware system has quarantined can only be released with a human challenge signal. Similarly during upload, an upload signal is awaited by receiving, providing, or entering the name of the upload site. Often thereafter, the file to be uploaded is browsed in the client's file system. Upon browsing and opening of the file, the malware detection managers automatically gets started scanning the file for any known virus/malware code while placing the scanned packets into the quarantine bin for transmission and eventual receipt. The system completes the upload by releasing the packets from the quarantine bin on the transmit side for sending to an end user and on the receive side for subsequent installation and use by a user, if no malware code bytes are found. Meaning, in some cases the transmit side will detect the virus in is pre-transmission processing and not send the contaminated code to the recipient destination. In other cases, the receive side may also run a quarantine malware detection algorithm and find something the transmit side missed and quarantine the file at the receiving end of the download operation.

In one embodiment, during upload and download operations the system may detect malware-like packets or data that eventually turn out to be genuine and capable of safe transmission across Internet. In such circumstances, it becomes essential to release those packets that were temporarily quarantined. This is often the case in complex detection sequences. For example, if malware detection needs to see bit sequences A, B, and C in an order and it finds sequence A in a first data packet, it may have to wait for later data packets before definitely determined the lack of the subsequent packets B and C. Therefore, the data packet with sequence A may be temporarily quarantined pending later processing that is used to determine if B and C are present later on other packets. In the case where a packet should be freed up, it becomes essential to release such packets automatically by the system. In other cases, it becomes important to flag questionable content for human review or special machine intervention and processing, and this processing may require human challenge authorization for certain packets before freeing them for transmission across the Internet. In one of the embodiment according to the present invention, the malware detection manager embodied this human challenge mechanism. Sometimes, automated processes and machined make mistakes, and it becomes important to release the incoming packet from quarantining when such mistakes do occur, or certain packets they are found genuine by analyzing the associated human challenge authorization on the incoming or outgoing packets.

Figure 2:
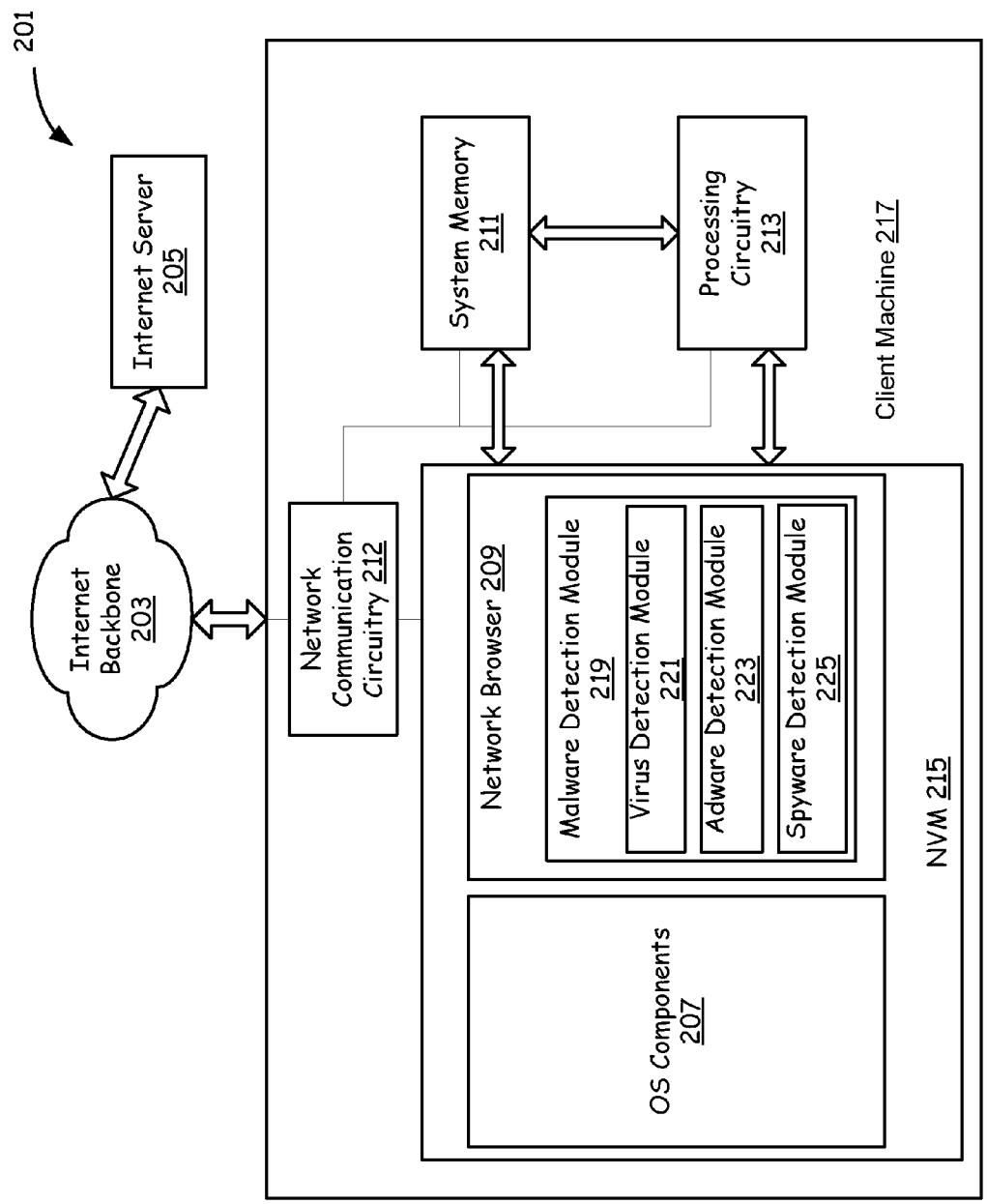
FIG. 2 is a block diagram, functionally illustrating a structure of various components of hardware and software including a malware detection manager within a client machine for purpose of implementing file security.

FIG. 2 is a block diagram 201 that functionally illustrates a structure of various components of hardware, software, and malware codes/programs within a client machine of FIG. 1. In FIG. 2, a client device can be any electronic device used by a consumer or human user, such as a cell phone, a personal computer (PC), a laptop, a net book, a personal digital assistant (PDA), a smart phone, a workstation, a point of sale device, or other electronic device. According to one embodiment, a client device 217, and an Internet server 205 are connected to an Internet backbone 203 (backbone 103 of FIG. 1, repeated). On the Internet, the malware code will get originated from some of the client machine that maliciously targeting other's files and resources on other client machines. In one embodiment, a Network Browser 209 with a built-in Malware detection manager 219 (which may or may not be a part of the network browser and may contain both hardware and/or software components) is installed as application software running on or in conjunction with an Operating System (OS) 207. The Malware detection manager 219 scans for malware code as data, software, packets, binary streams and other information is transferred to and from the client device over a network interface 227. The network interface can be one or more of a wireline interface, wireless interface, optical connection or any other interface for transferring data or information. The Malware detection manager 219 performs the aforementioned virus detection with its constituent components and sub-components: a Virus Detection Module 221 for scanning for virus codes, patterns, logic, and sequences; an Adware Detection Module 223 for blocking pop-up ads and other similar content/data, and a Spyware Detection Module 225 for blocking Spyware scripts that are intended to add and remove information from a client device in a concealed or undesirable manner. Both the OS and any application software installed on the client device are residing in a Non Volatile Memory (NVM) 215, hard drive memory, or a read only memory (ROM). When OS components 207 and the Network Browser and Other User Applications 209 are run by malware detection logic and a comparison agents taught herein, they are copied to System Memory 211, which is communicatively coupled to NVM 215 within a Client Machine 217. System memory 211 is often static random access memory (SRAM), dynamic random access memory (DRAM), erasable programmable read only memory (EPROM), magnetic memory, optical memory, or other similar memory devices. The client of FIG. 2 performs the virus detection and quarantining operations previously discussed in conjunction with FIG. 1. The processing circuitry 213 of FIG. 2 is one or more central processing units (CPUs), a digital signal processor (DSP), a graphics processing unit (GPU), an application specific integrated circuit (ASIC), a field programmable gate array (FPGA), a multi-core device, a system on a chip (SoC), a microcontroller unit (MCU), or other logic that can execute software move data or perform other management functions within FIG. 2. Connection to the external environment, peripherals, and other networks is accomplished through memory and processing circuitry of FIG. 2 communicated through a network communication circuitry block 212 in FIG. 2. Circuitry block 212 can support any number of communication methods and protocols including wire line, wireless, packet based, high speed serial, optical, encrypted, and like communications.

Figure 3:
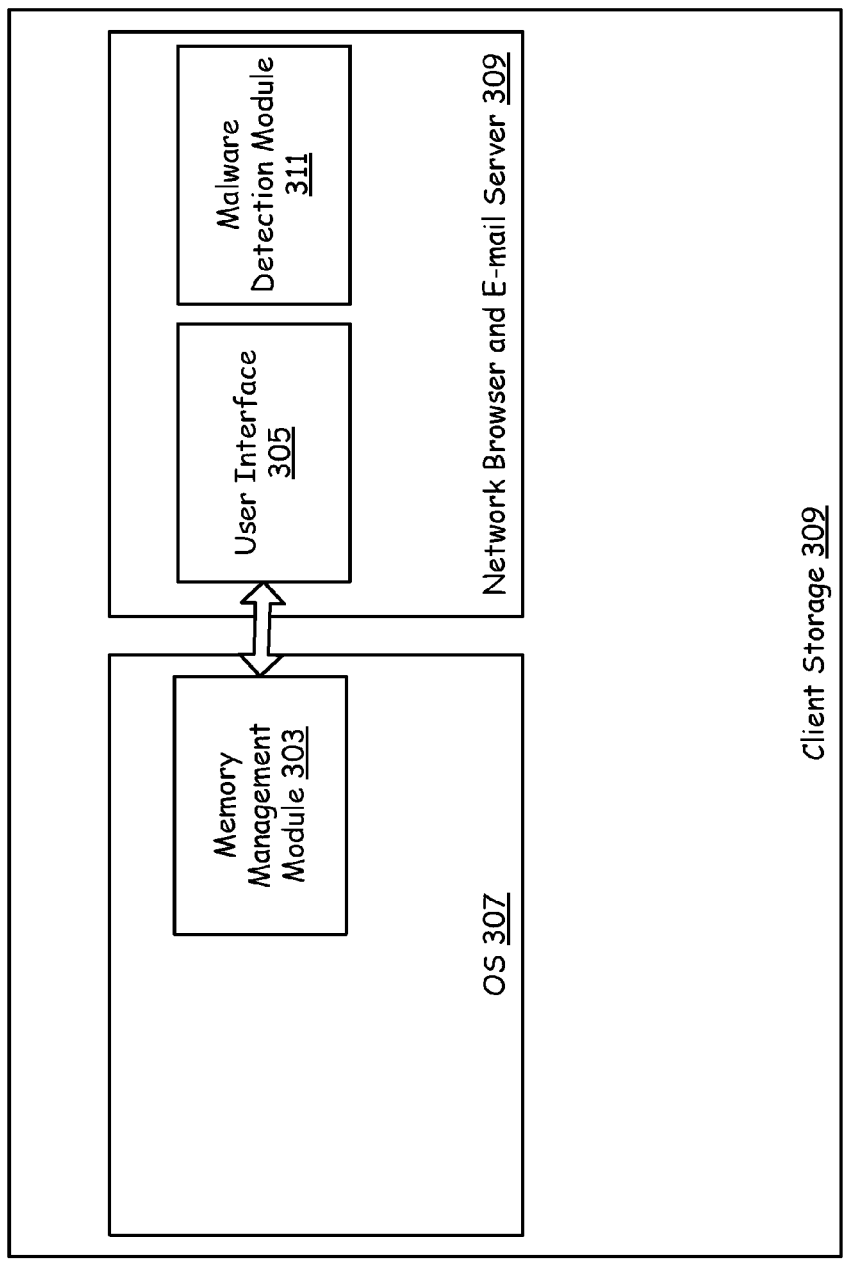
FIG. 3 is a block diagram illustrating a client storage device with relevant programs and system software components residing in the client storage device.

FIG. 3 is a block diagram 301 that illustrates a Client Storage device that is a portion of the NVM 215 or system memory 211 of FIG. 3. The Client Storage device 309 of FIG. 3 has certain specific programs and system software components residing in it, which emphasizes the formation and definition of the quarantine bin, as a special directory, often within the system memory 211 of FIG. 2. According to one embodiment, the Client Storage 309 represents the memory from which OS 307 (OS 207 from FIG. 2 repeated) runs, which is often system memory 211 when the client device is in operation. The user Interface 305 is at least a pop-up window or control panel prompting the user to enter the memory size in bytes for allocating to a quarantine bin for quarantining the scanned packets upon transmission and receipt of data from the client device. In addition, as previously discussed, the control panel or pop-up window can be used to set isolation or security options for the quarantine space so that the program can engage in active malware detection through use of a virtual machine within the client device 217 of FIG. 2. Upon the user entering the memory size in bytes into the interface 305 of FIG. 3, the Memory Management Module 303 allocates a memory area for the quarantine bin that can be static or dynamic over time as needs and functionality change. In one embodiment, the Network Browser and E-mail Server 309 comprise a User Interface module 305, and a Malware detection manager 311 for scanning for any malware code that could enter the client device from any download center, from web mails, etc. During the download or receive process or leave the client device as transmitted data. If any malware code is sensed, the tool may continue downloading or transmitting and packets will be permanently quarantined or destroyed or may be released after the download from the quarantine bin on certain conditions, or the download process can be aborted and the data current received or transmitted quarantined or destroyed in part. In another embodiment, the process will either be stopped and the packets quarantined or destroyed, or the download or transmission will be completed in a secure quarantine area with the option for a human challenge signal to be processed to release the file from the quarantine bin for a normal file transfer on the network.

During the upload or send process, packets for a given file are scanned and quarantined and released from the quarantine bin after the complete scan once no malware code is found. During both download and upload processes, a file can be released from the quarantine with human challenge authorization or a machine override configured by the user to recognize certain pieces of safe code that sometime inadvertently appear as malware or infected code, but is actually normal code that is not harmful.

Figure 4:
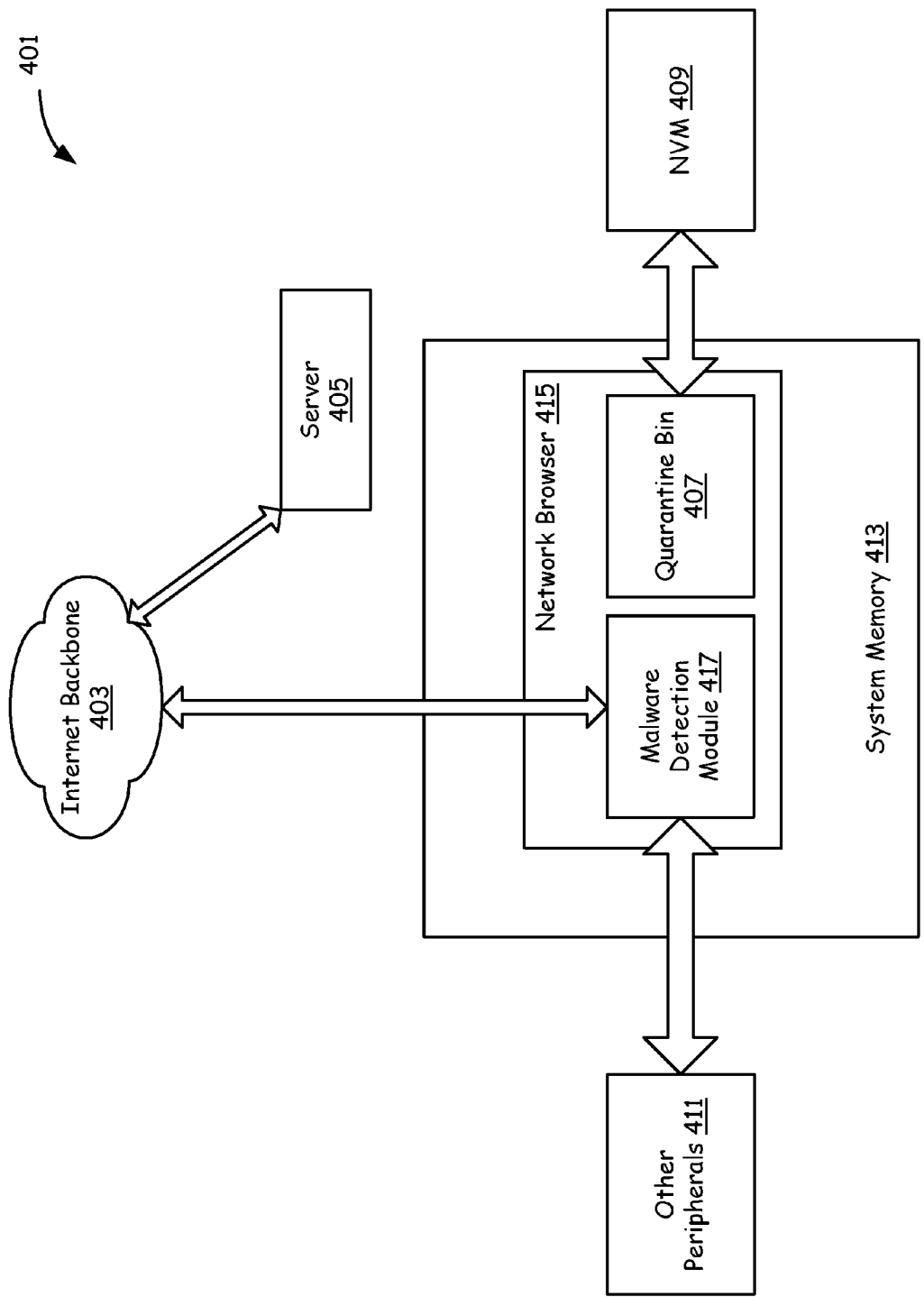
FIG. 4 is a block diagram illustrating the configuration of various hardware and software components along with a quarantine bin and their interaction.

FIG. 4 is a block diagram, illustrating the configuration of certain hardware and software components and their interaction in a malware detection system 401. According to one embodiment, a file transfer to and from the System Memory 413 occurs to or from final storage at NVM 409 or system memory 413. The receipt or transfer of data, code, or information is coordinated using the Network Browser 415 or other software/applications operating in conjunction with a built-in Malware detection manager 417 using a quarantine bin 407. The client device in which the system memory 413 resides is communicatively coupled with Other Peripheral devices 411 and the Internet Backbone 403 (similar to backbone 103 of FIG. 1, repeated) that is also coupled to a Server 405 (similar to server 105 of FIG. 1, repeated). While malware can enter a client device through the Internet, various malware codes can also enter a client device through various Input/Output devices coupled to the client device and indicated as Other Peripherals 411 in FIG. 4. Conventional virus scanning software (e.g., Norton utilities, etc) becomes redundant if the Malware detection manager 417 is built into Network Browser 415 (similar to browser 111 of FIG. 1, repeated) and performs the function of scanning the files from Other Peripherals 411. During the download, transmit, and malware scan, the file is placed in the Quarantine Bin 407 which is a secure and isolated part of memory where the residence of viruses or other malware can cause no harm. The transmitted or received code/information can only be released from quarantine if free from malware code or with a human challenge authorization that overrides the positive malware detection of the system.

Figure 5:
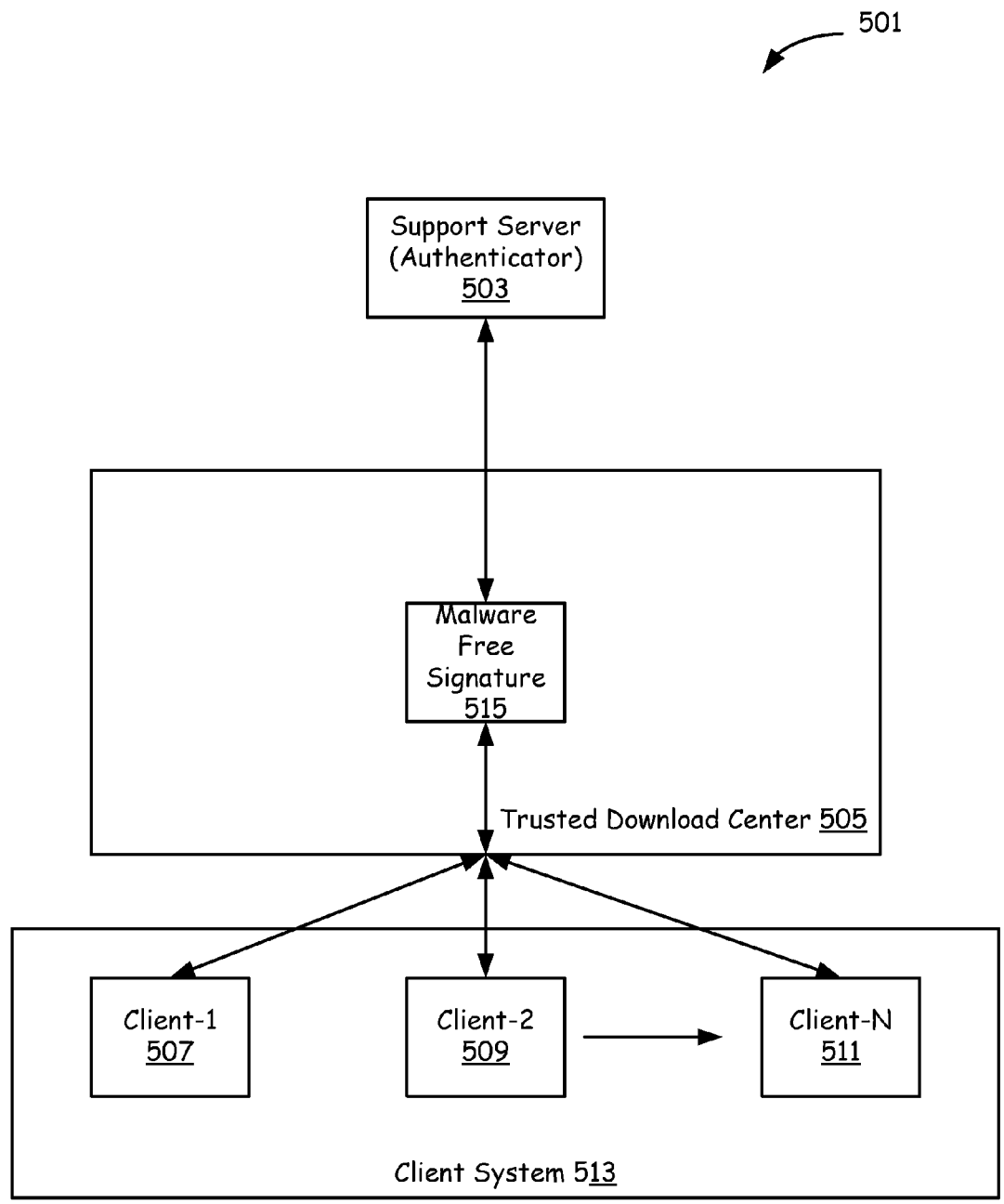
FIG. 5 is a block diagram illustrating multiple clients that are visiting a Trusted Download Center that has malware free signature authentication, according to one embodiment.

FIG. 5 is a block diagram 501, illustrating multiple clients 507-511 in a client system 512 that have access to a Trusted Download Center 505 where malware free signatures or processes could be attached or associated with each available downloaded file packets, data sets, or applications. In one embodiment, the files which are repeatedly downloaded or downloaded by many clients from a trusted download center need not be scanned if they can be certified and maintained in a malware free state with certainty over time. A Support Server 503 communicatively communicates with a database referred to herein as Trusted Download Center 505. The center 505 authenticates the database or data to be downloaded by a frequent and periodic scanning of the stored files by attaching a Malware Free Signature 515. A malware signature and process can be used to scan the code to ensure its 'safe state' over time while resident on the center 505, and similar signature codes and software may be provided, copied, resident or accessible by clients to once again verify that what they have received is what was transmitted, a safe malware-free program or set of data. When a file is downloaded from such a download center in one embodiment, each packets corresponding to that file will carry a copy or some sub-portion of Malware Free Signature 515. These packets, upon arrival into a Client System 513 (which comprises several client devices, such as Client-1 507, Client-2 509, and Client-N 511), will be analyzed by the Malware detection manager to ensure the authenticity of the Malware Free Signature 515 that is associated with the packets. This Malware Free Signature 515 may be a simple label, with the time, last scanned and the scan status, or may be a complex signature analyzer sequence, encrypted codes, series of checksums, or like verification protocols. Upon reading this information and any possible software needed to do the scanning, the Malware detection manager 115 of FIG. 1, on a client device, may accept, and save the packets from the quarantine bin without a scan. In other embodiments, even if a signature 515 and associated process determines that no malware could be present due to the pre-scanned and unchanged state of the software/data downloaded, the system or client may still opt for a local client-side rescan, if desired. When several Clients connect to one download center for repeated downloads, such a central scanning mechanism is highly efficient as slower transmit rates and computer intensive server and client side scans can be eliminated.

Figure 6:
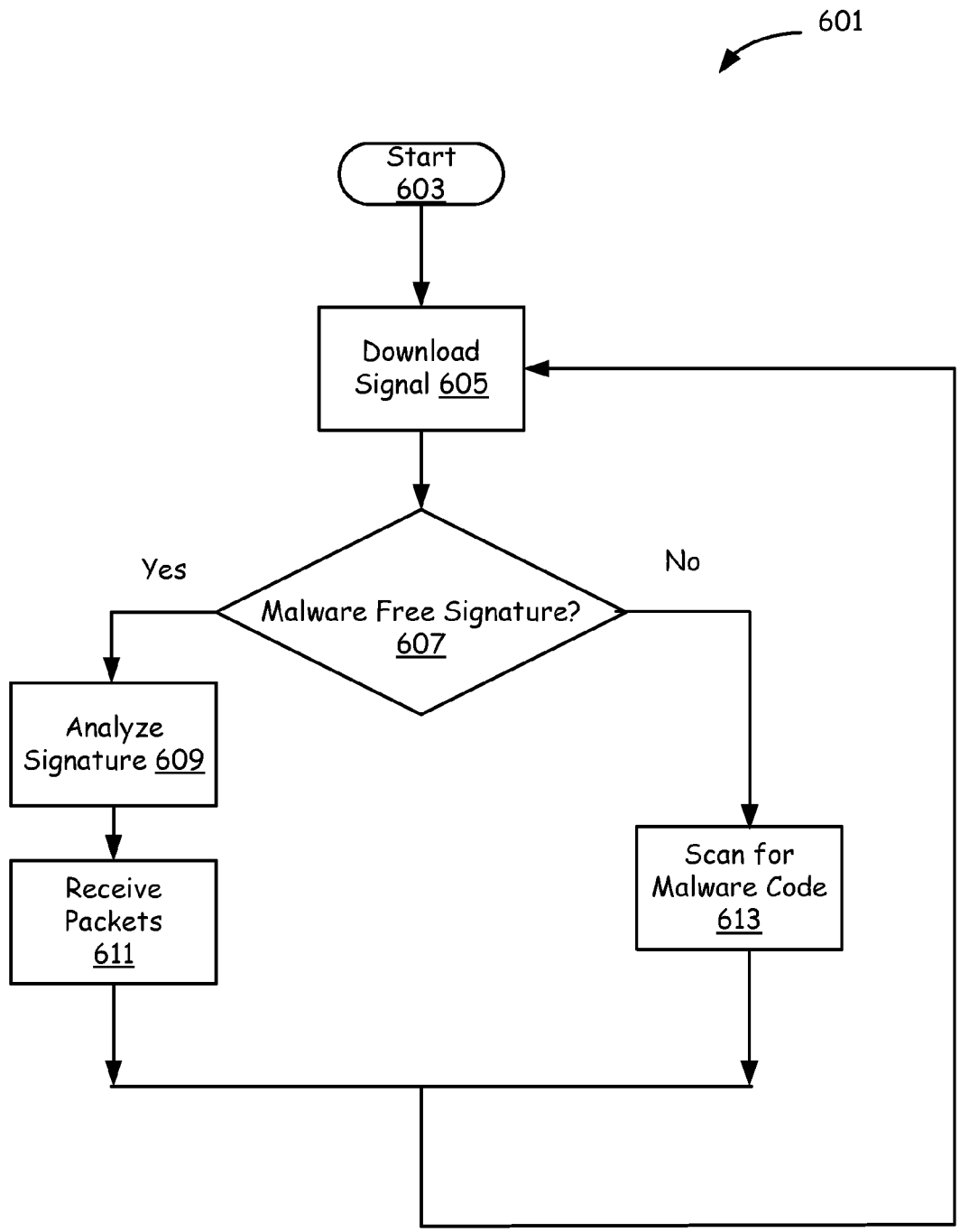
FIG. 6 is flowchart illustrating an operation sequence performed by a malware detection manager, during a repeated visit to a trusted download center, according to one embodiment.

FIG. 6 is flowchart 601 that illustrates an operation sequence performed by the Malware detection manager 115 of FIG. 1, during a repeated download from a Trusted Download Center 505 as illustrated in FIG. 5. The flowchart 601 illustrates the operation involved in a repeated or simultaneous download from a trusted center of FIG. 5. Starting at block 603 the process moves to a wait state indicated or started by initiating a Download Signal 605. Upon receiving a download signal and after entering the name of the download center in the Network Browser 111, of FIG. 1, the required file to be downloaded will often be prompted for verification to user from the download center. When the required file is selected and verified for download and the Download Signal is received at block 605, the packets or data pertaining to the selected file start arriving at the client's port through the network communication circuitry of the client device. Each of the packets alone and/or in assembled aggregate is checked for the presence of Malware Free Signature at the decision box 607, when received by the client (and possibly as transmitted by the center/servers 505. If the signature is not attached with the packet, the packet undergoes scanning from the quarantine bin at the block Scan for Malware Code 613 as further taught herein, and the packets are released if no malware code is detected, else quarantined. Quarantined files may require human challenge authorization in order to be released.

If the Malware Free Signature is found or a malware free process is available for this download, then at the decision box labeled Malware Free Signature 607 the authenticity of the signature is tested further through subsequent analysis of the signature data at the block Analyze Signature 611. The packets may be received directly without detailed malware scanning and processing if the affixed signature is valid with right time stamp as processed via the malware code and quarantine bin, otherwise the packet undergoes rescanning looking for the Malware code that may be associated with it. This process is repeated for all the packets pertaining to a file or download, or for all the files waiting the download signal.

Figure 7:
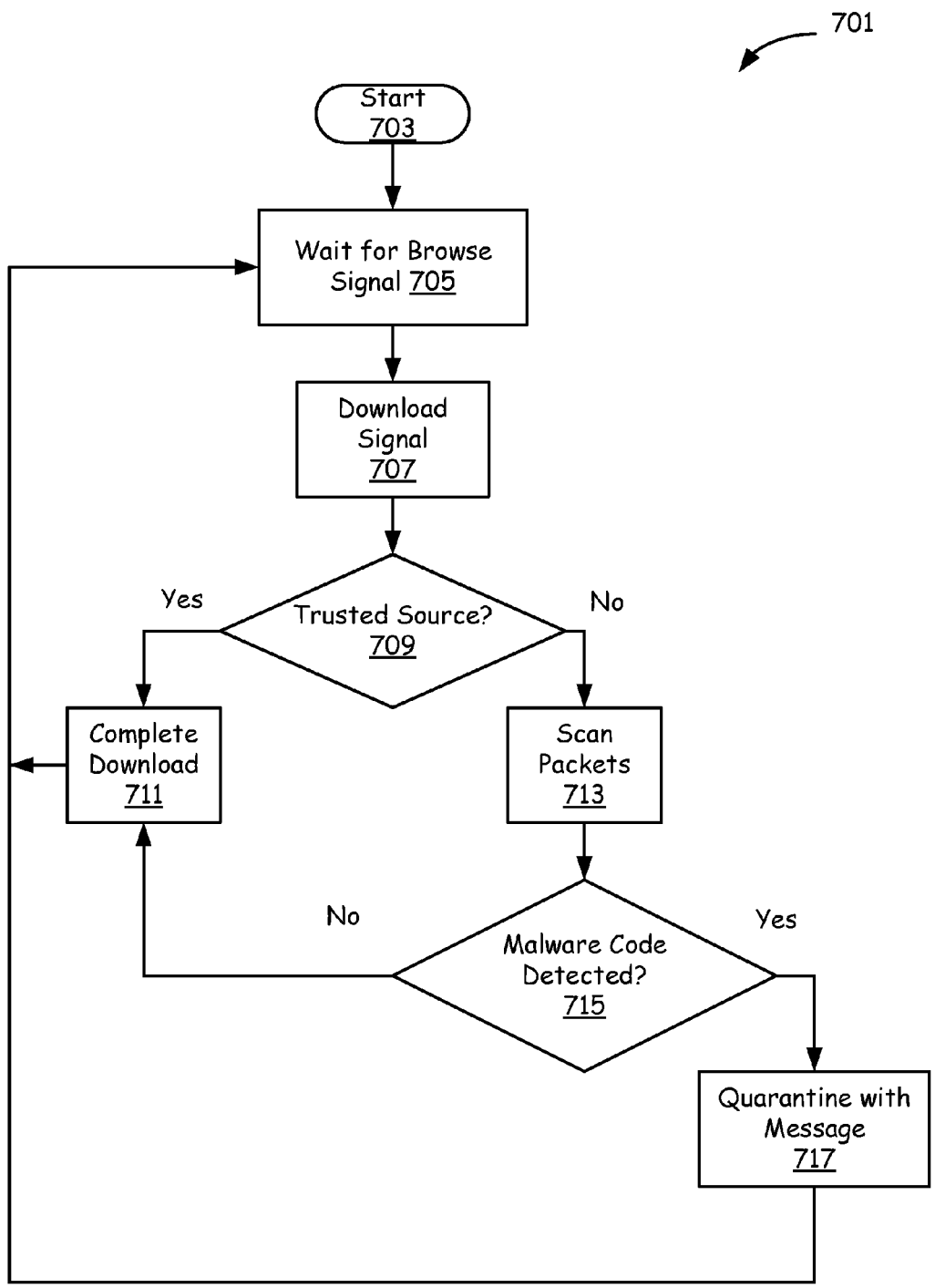
FIG. 7 is flowchart illustrating a general sequence of operations performed by a malware detection manager, during the download process, according to one embodiment.

FIG. 7 is flowchart 701 that illustrates a general sequence of operation performed by the Malware detection manager 115, of FIG. 1, during a download process. According to one embodiment, the user enters the name of the download center, gives the download signal, subsequently check for the trustworthiness of the Download center by checking the authenticity signature before proceeding to download into the quarantine bin (if applicable). If the download center lacks trustworthiness the Malware detection manager will execute malware detection processes on the incoming packets that are initially placed in the quarantine bin for processing.

After starting at the block Start 703, the Internet browser 111 of FIG. 1, enters the state Wait for Browse Signal at 705. After entering the name of the download site and when the browse signal is issued by the user, the client device will be connected to the download site and enter the state labeled Waits for Download Signal at 707 in FIG. 7. Upon initiation of the download signal, the packets start arriving. Each packet will be checked for the presence of Malware Free Signature in the decision box 709 while they are being processed through the secure and isolated quarantine memory space. If the packets are authentic with the valid signature provided from a trusted source, they will be fully downloaded and released from quarantine as described in FIG. 6 by entering the state labeled Complete Download 711. Otherwise, each packet is subjected to the malware scanning for any presence of the malware code bytes, sequences, etc., by entering the state labeled Scan Packets 713 in FIG. 7. The stream of incoming packets are checked one by one or in assembled forms, as indicated in the decision box 715, until all of them are quarantined and released, provided no malware bytes are found. If any virus bytes, programs, or sequences are detected after entering the state labeled as decision box 715, the packets are never released from quarantine bin or are destroyed with a massage displayed to the user and/or transmitting device indicated at the block 717 in FIG. 7. The file can only be released on human challenge authorization or additional manual scanning which a user can perform with other software to determine if the file is genuine in spite of failing the automated malware detection process.

Figure 8:
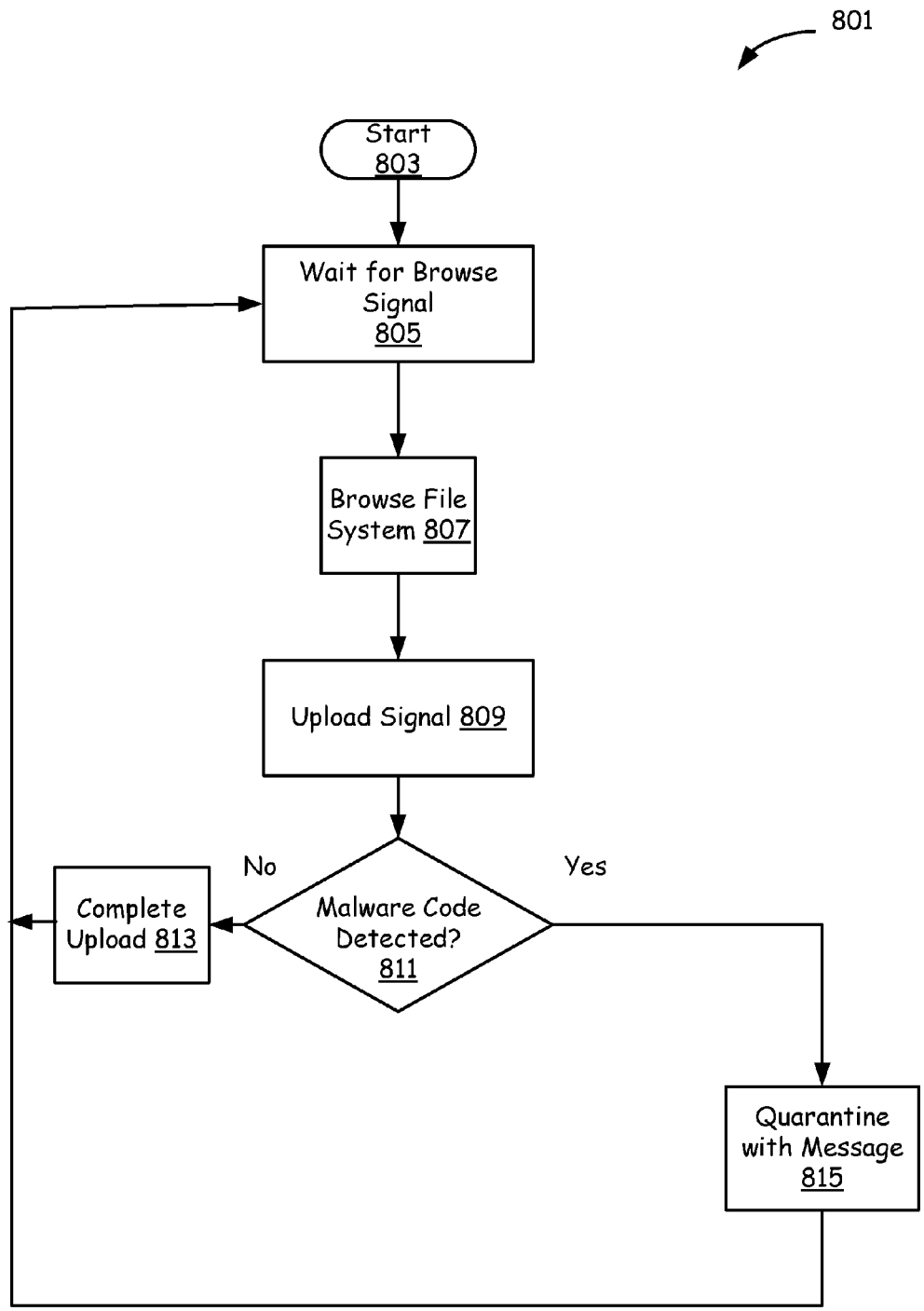
FIG. 8 is flowchart illustrating a general sequence of operations performed by a malware detection manager, during the upload process, according to one embodiment.

FIG. 8 is flowchart 801 that illustrates a general sequence of operation performed by the Malware detection manager 115 of FIG. 1 during an upload or transmit process. According to one embodiment, a user enters the name of the upload center and subsequently browses for the file to be uploaded from the file system within or associated with the client device via steps 805 and 807. To allow the upload to commence, the user or the client device initiates the upload signal in a step 809. During uploading of the file, code, or data, the Malware detection manager (see FIG. 1) is executed or initiated to scan the packets that are first placed or moved into the quarantine bin via a step 811. Once scanned, the code, file, or data is released in portions or in an entirety and uploading commences, if none of the packets are infected by any malware code bytes via a step 813. If at least one packet is seen to be infected, the quarantining will be continued or the file destroyed with a display of a message to the user and the recipient device in a step 815. In such case where malware is detected, the file can only be released for upload operations via a human challenge authorization if the user can determine through other means that the file is genuine and not in fact affected by malware or been purged successfully of the malware before uploading (or downloading as the case may be).

After starting at the block Start 803, the browser enters the state labeled Wait for Browse Signal at 805. After entering the name of the upload site and when the browse signal is issued by the user or a client device, the client will be connected to the upload site and issue a browse the file command on the client file system at the block Browse File System 807. When the file is browsed and opened for upload via the block called Upload Signal 809, a signal is issued to begin the file upload. Simultaneously to transmission or prior to transmission, the Malware Detection Module 115 of FIG. 1 will be invoked and starts placing and scanning the upload packets in the quarantine bin unless one or more packets are found to be infected by malware code. If no malware is found, all the packets are released for the upload process completion whereby the uploaded files can complete transmission from the client device and released for removal from quarantine on a receive side if similar malware-free scans have also been optionally completed. Therefore, if no malware is found, the system completes the upload as indicated on reaching the state labeled Complete Upload 813 and the algorithm returns to the state indicated by the block Wait for Browsing Signal 805 to process another upload. If at least one packet of the file intended for upload is infected by any malware code, the packets pertaining to that file are not released from the quarantine bin and may not even commence with transmission in some embodiments or circumstances. If malware is found and the upload operation compromised, then the system displays a message on this quarantined or restricted file status as indicated at the block Quarantine with Message 815. From this state the program execution state is returned to wait for Browse Signal 805 state. The quarantined file can often only be released on human challenge authorization as taught herein.

Figure 9:
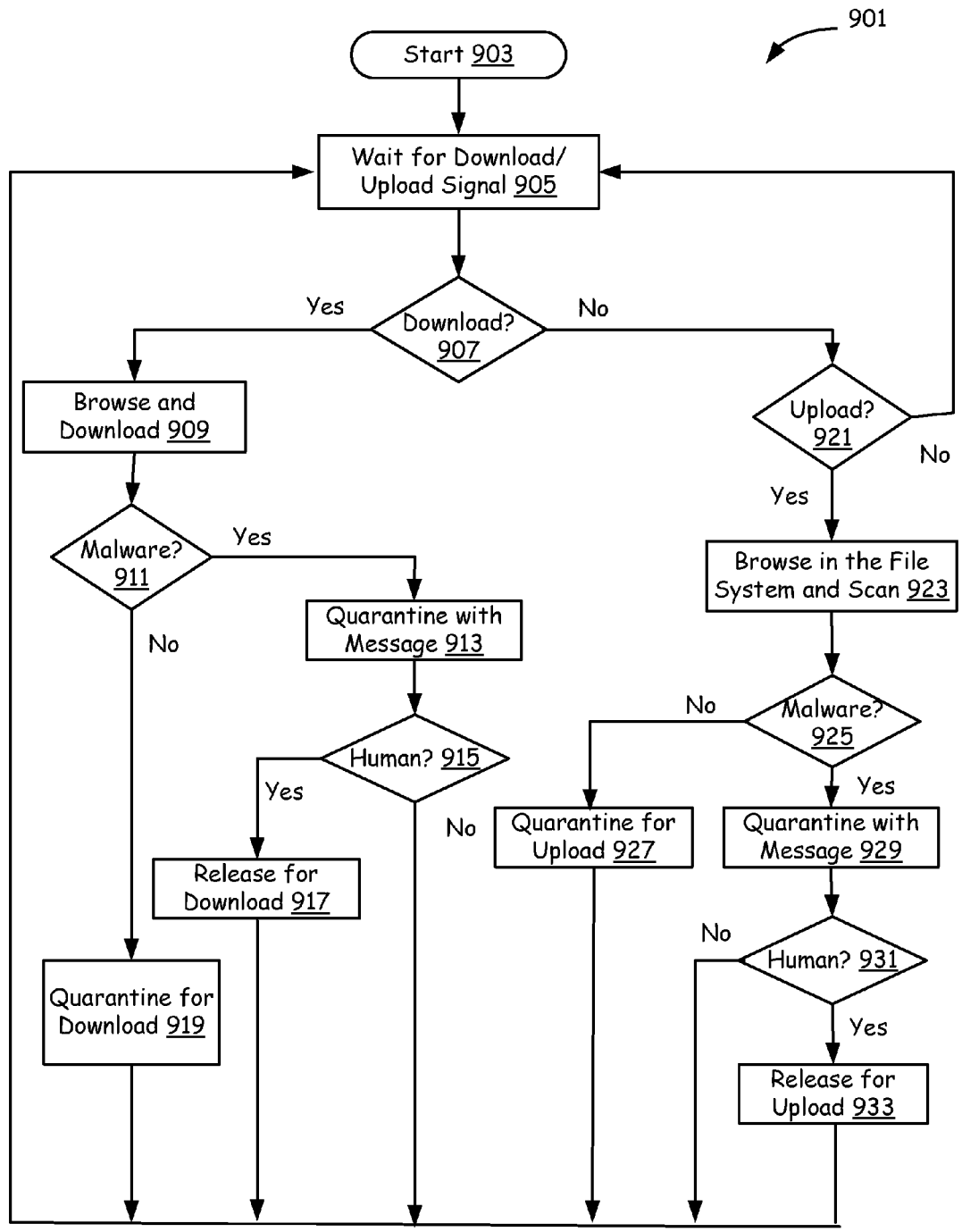
FIG. 9 is a flowchart illustrating a general upload/download sequence of operations with human challenge authorization for the release of genuine packets, according to one embodiment.

FIG. 9 is a flowchart 901 that illustrates a general upload/download sequence of operation with a human challenge authorization option that may be used to release the packets from the quarantine bin that appear like malware code via the Detection Module 115 of FIG. 1, but are actually safe and legitimate software or data. In one embodiment, this feature is useful when two groups interact on the internet and one or both groups are capable of fixing or overriding with new information/analysis various malware related problems. The human challenge authorization is useful during both the upload and the download operations. In accordance with one embodiment, when a malware code is detected in a downloading or uploading packet sequence, the packets are quarantined whether or not they are actually infected and packets are only released for completion of the transaction if there is no infection detected or likely. The release of infected packets or packets suspected of infection occurs only with a successful human challenge authorization either during an upload or download operation.

After starting at the block Start 903, the Internet browser 111 of FIG. 1, enters the state illustrated as Wait for Download/Upload Signal 905, and the browser waits for a download or activation signal to go active. When a download signal is issued, it is often after a user or client device provides, determines, or enters the name of the download center, at the decision block labeled Download 907. After provision of such information, the Network Browser 111 of FIG. 1 will browse to that site or location. After a user or client device selects the file to download, and on activation of a download signal, the Malware detection manager 115 of FIG. 1 will scan for Malware Code reaching the state, block, or step 911 in FIG. 9. If there is no Malware code discovered by the processes taught herein in the earlier FIGS. 1-8, then the packets that were processed in quarantined space are released to main storage (e.g. NVM, main system memory, SRAM, DRAM, hard disk, etc.), as indicated at the block labeled Provide for Download 919. On the other hand, if the packets are believed or definitively determined to be infected by Malware code (viruses, Trojan, spybots, adware, illegal code, illegal data, etc), the file packets are quarantined in the secure and at least semi-isolated quarantine space taught herein via the state labeled Quarantine with Message 913 in FIG. 9. At this step 913, a message may be issued to the user working the client device terminal or other interested parties that the quarantine has occurred or that malware was found. If the quarantined packets are processed to clean up the malware issue or are determined to be genuine and malware free even though the malware detection protocol flagged them as suspect then upon reaching the step 915 in FIG. 9, a human challenge authorization can be issued to release the quarantined download via the block 917. If the human user or other more rigorous analysis in the quarantine space does not free up the data for malware-free continuation of transmission, then the packets will remain quarantined and/or destroyed, and the download operation will be stopped. At the end of the aforementioned sequence of operation, the Network browser enters back into the state labeled Wait for Download/Upload Signal state 905 to process more transmit, upload, receipt, or download operations.

As another additional function or embodiment, the Browser of FIG. 9 can perform secure malware-scanning upload operations as well. For this operation, the system begins in a wait state via a block 905 in FIG. 9. When an Upload signal is issued, as shown at the decision block 921, the state 905 is exited. If there is neither a download nor upload signal, the browser continues to be in the state 905 doing other useful work while waiting for the appropriate signal to be received. On the occurrence of an upload signal, the Browser will prompt for browsing to the right file in the client or server File System. Once that file or files is found and accessed for upload, the Malware detection manager 115 of FIG. 1 may start the scanning process either in the current place where the data is stored or in a more secure quarantine space where the data is copied to via the state labeled Browse in the File System and Scan 923 in FIG. 9. After the malware scanning process completes, all the packets are quarantined and released for upload to reach the indicated Quarantine for Upload 927 if they are deemed safe. However, if there is a determination that any of the known malware code bytes are detected in the file packets, the packets so affected, or all packets in the download, are quarantined and secured to avoid further promulgation and damage from the malware. If the packets are believed to contain malware code, then the file will remain quarantined and the upload will be stopped with a message issued to the user working at the client terminal or other interested parties/computers, on reaching the state labeled Quarantine with Message 929 in FIG. 9. If the quarantined packets appear to be genuine and malware-free given the malware scan process, then a human challenge authorization can be issued by the user or a client or server to release the quarantined data for upload via reaching the decision box 931 in FIG. 9. If malware is detected or seriously suspected, then the packets will be quarantined and the upload will be stopped, and the packets may be deleted or destroyed. At the end of aforementioned sequence of operation, the Network browser enters back into the state labeled Wait for Download/Upload Signal state 905 to process more upload or download operations. In addition, several work flows can be moving through FIG. 9 at the same time whereby many different upload and download operations may be operating in tandem or parallel under the control or one or several CPUs. In a complex server, it is not unlikely that hundreds or thousands of malware transmissions and scans can be ongoing at overlapping times.

Figure 10:
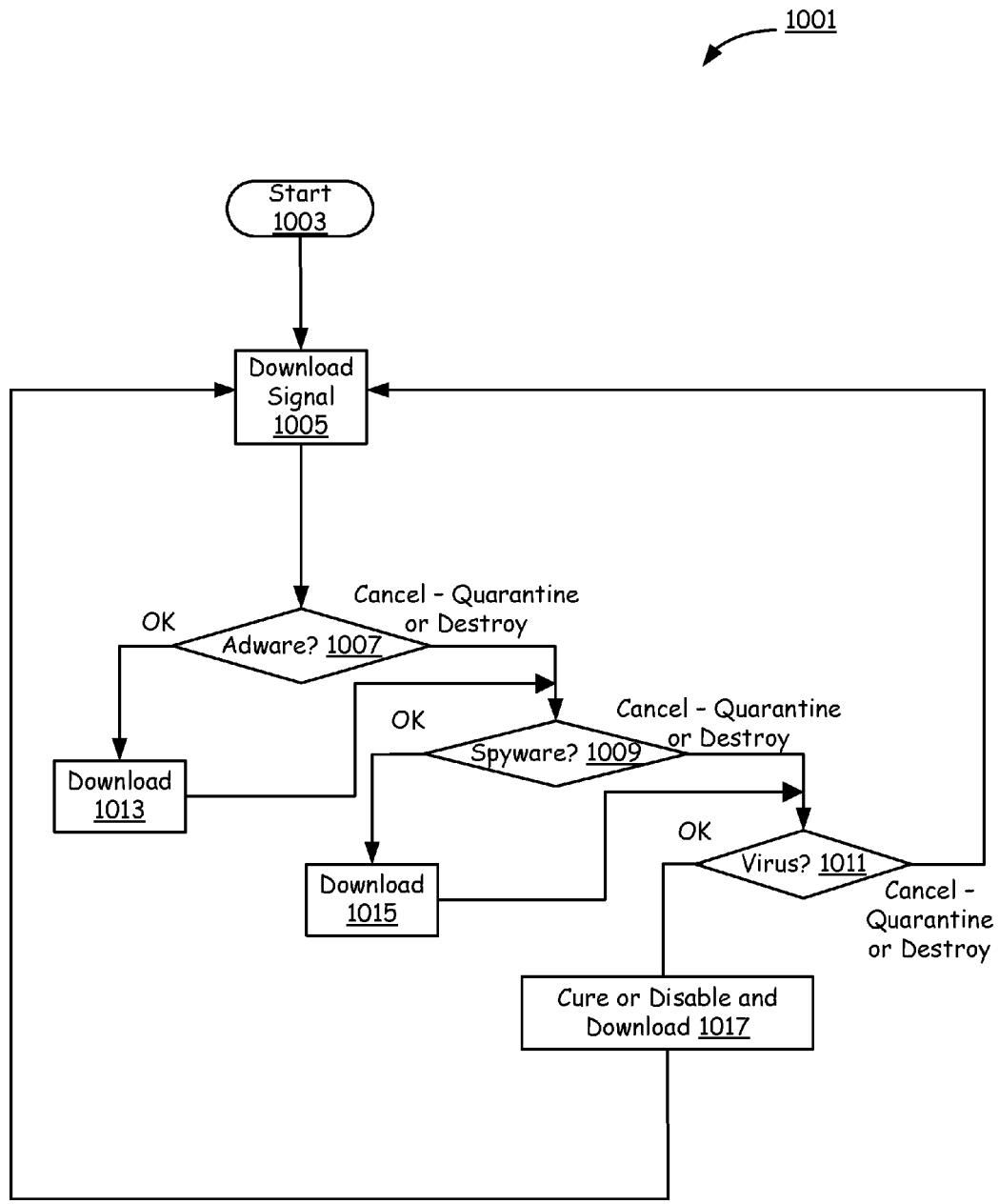
FIG. 10 is a flowchart illustrating the blocking or downloading of various malware code components, such as adware, spyware, virus, etc., based on user choice during a download process.

FIG. 10 is a flowchart 1001 that illustrates the blocking or downloading of various malware code components, such as adware, spyware, viruses, etc., based on user choices during download process. Once any form of malware is detected, the browser may offer users several preventative or corrective options via pop-up warnings labeled as "Adware Detected; if you click OK, adware from an ad site will be loaded in a new window, else click CANCEL to abort." Some downloaded software or cookies will prompt user during installation, e.g., "this software or installation requires your system to send a run time report or data to this server upon any error or upon certain conditions." If user selects OK, it may become consent for activating spyware on your system and the malware programs taught herein may be overridden to allow that "malware" to be placed on the machine since the user desires to have that "malware" functionality on their machine. These consented spywares or adwares may remain active as long the tool is running on your system, and the malware program can continue to monitor and recognize such programs so that they may be removed in the future if the user later changes their mind and desires not to be affected by those adware or spyware programs or data. The user may be tempted to select "OK" because selecting "CANCEL" option may not allow user to install. Or, a user may sometime make this choice accidentally, maybe resulting in sending all sensitive data or personal/confidential data outside the users secure system. So, these spyware programs may be continually monitored and result in numerous notices to the user to inform the user what the program is doing, and these operations are often invisible or covert whereby the malware program can provide some visibility to its operation to the user for better understanding and protection for the user. Furthermore, this allowed "malware" can sometimes be disabled selectively or enabled selectively only in certain safe or user-approved circumstances once detected, tagged, and continually supervised by the MD module taught herein. Java scripts associated with a web page download may contain a virus and yield a message like "WARNING, a virus has been detected" by the MD module. The system may then prompt the user that a certain virus has been detected in the requested page, upload, or download; and ask the user if they want to select OK and download the program anyway. In these cases, the MD module will inform the user that the program or client device will monitor the malware or virus and attempt at all times to prevent the virus from harming the user's computer if the user decides to otherwise complete the download. Selecting CANCEL will return the user to a previous page or previous computer state and abort the download attempt, possibly deleting or destroying the data in the quarantine space.

Note, that the Virus could be cured or disabled automatically with or without user (i.e. human challenge) authorization by placing instructions into the client or server device for doing so via the MD Database or via code made part of the operation of a specific Comparison Agent.

In FIG. 10, after starting at the block 1003, the process enters into a wait for download state at a step 1005. Upon download, if an adware is detected or pops up in quarantine as shown in the decision box 1007, the client may download the "malware" and allow it to be fully installed on the client device with optional monitoring protection if OK is clicked by a user or the malware is properly limited in functionality or reduced in harm by software in the MD module via a step 1013. If the download is cancelled, the MD manager will stop the adware transmission portion of the transaction and attempt to continue by entering the state 1009. However, if the process of transmission and download/upload continues, then the process continues and looks for any spyware content in the download. If the user selects OK to download the spyware component in spite of the detection of the spyware via step 1015, then the MD module may allow the data to be downloaded and used in the client device, subject to possible oversight and special harm-prevention processing by the MD module from that time forward. By selecting a cancel operation, the client device will cancel the download of the spyware but attempt to continue to download to an ongoing partial degree. At the block 1011, the process then looks for any virus code and provides a warning to the user if such code is found. If the user selects OK as an indication that the user wants to accept the virus and continue the download the MD module will attempt to file, process, modify, limit, or cure the virus or otherwise disable it or reduce their functionality at the block 1017 and continue the download. If the user cancels the download due to the detection of a virus, then the process will stop virus download or kill the download in its entirety and go back to the wait state at block 1005. It is important to note that in some cases, an adware, spyware, or virus cannot be separated from the underlying normal code without destroying or changing the operation or purpose of that underlying normal code. In that case, if the user decides to try to remove or limit the malware and such processing is not possible without destroying the underlying program or data, then the MD module will so not this to the user and recommend to the user that the whole transmission be terminated and purged from quarantine space.

Figure 11:
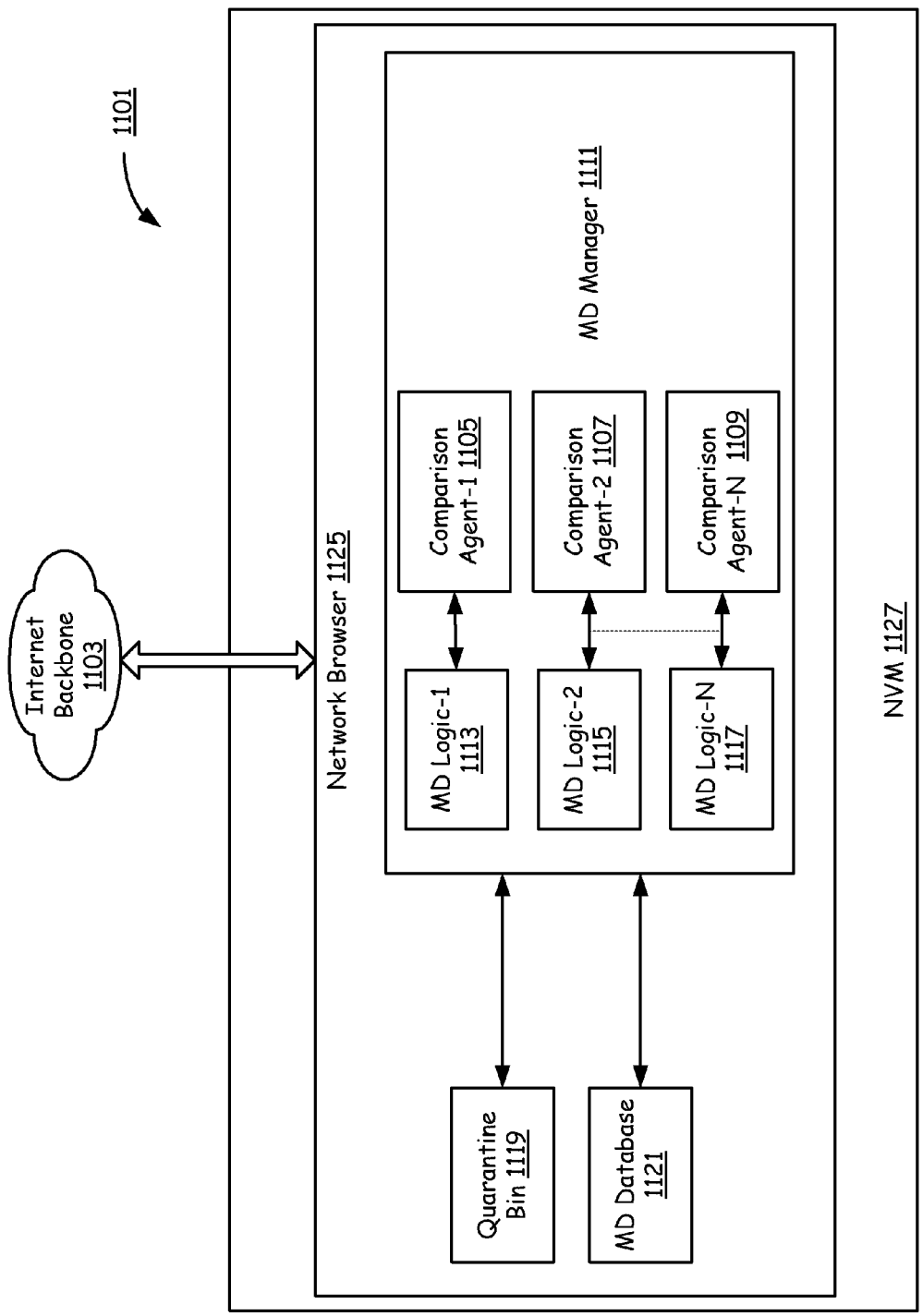
FIG. 11 is a block diagram illustrating a more general method of malware detection, based on parallel processing of malware code detection, using a Malware Detection (MD) functionality module.

FIG. 11 is a block diagram 1101 that illustrates a more general method of malware detection, based on parallel processing of malware code detection, using a Malware Detection (MD) functionality module. The Malware Detection functionality could be a first come, first served type engine that analyzes a full file only after it has been completely downloaded. Once that file has been verified as malware free, this type of engine would turn attention to the next file that was received (starting at either the beginning of download time or the download completed time). The Analysis would be to compare the file against one or more known Malware byte sequences, logic, and constructs from a malware database.

According to one embodiment, the Internet backbone 1103 (backbone 103 of FIG. 1, repeated) is communicatively coupled with the network browser 1125 in FIG. 11. The network browser resides in NVM 1127 and/or other system memory of the client device. The network browser 1125 comprises MD manager 1111 as the main module that implements the MD functionality. A plurality of comparison agents (CA) 1105, 1107, and 1109 operate in conjunction with a plurality of MD logic modules 1113, 1115, and 1117 to do the comparison for known malware code bytes from the MD database 1121 with the upload/download files placed temporarily into the quarantine bin 1119 for malware processing. The file will be treated as infected while in the quarantine space and being processed, and if the CA and MD logic pairs find any form of malware code, then the file will be isolated in the quarantine space permanently, destroyed, or kept until released by a human intervention or via the infected file being repaired or isolated from the normal code that is being transmitted through the quarantine bin.

A typical web browser is modified to integrate a quarantine location/process into the download path before receipt for display by the html engine. The Malware Detection functionality could be made more efficient than first come first serve in several ways. First, it could operate faster by analyzing the file's bit stream as it is received, rather than serially after it is downloaded. Second, it could be made to parallel process an incoming stream or streams of data. This could be done by having an agent launched or dedicated to each pending file downloaded or multiple agents assigned to a single file whose download is in progress, and/or many comparison agents and logic could be assigned simultaneously to a single data stream so massive checking of malware on a single stream occurs in parallel over time. In one example, a user is may want to start or view a web page on a web browser, and the content via that web page should be displayed only after it has been analyzed and concluded to be malware free. The user decides to click on a link and trigger the Malware Detection process as the page is transmitted. Instead of downloading and directly displaying the underlying html/xml plus all associated graphics, photos, java/flash, etc., like a traditional browser, all elements and separate content to be downloaded are "intercepted" (even before they are saved to disk and most likely even before they are requested) and compared for malware using the Malware database and process. In this case, a web page may present text before pictures and pictures before video as it takes time to parallel process, maybe through different malware algorithms, all the content coming to the client device.

As one of ordinary skill in the art will appreciate, the terms "operably coupled" and "communicatively coupled," as may be used herein include direct coupling and indirect coupling via another component, element, circuit, or module where, for indirect coupling, the intervening component, element, circuit, or module may modify the information of a signal or may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. For example, even though FIG. 10 illustrates adware being checked before spyware that is checked before viruses, this order may be changed to any order.

The present invention has been described above with the aid of functional building blocks illustrating the performance of certain significant functions. The boundaries of these functional building blocks have been arbitrarily defined for convenience of description.

Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

While the embodiments taught herein are discussed with respect to the Internet backbone, the embodiments taught herein can be used on any network, the Internet, intranet, personal area network (PAN), local area network (LAN), wide area network (WAN), WiMax, WiFi, cellular or other wireless technology, CDMA, optical, or any other network.

In addition, note that most embodiments herein teach performing malware code scans in response to transmission or receipt of data, wherein the data often is processed at the request of a web browser or like software. The data is quarantined while being scanned or simulated in a safe environment and then released to the computer if no malware or malware operation is detected. Therefore, while this software can be used to replace commercial virus software like Norton Utilities, etc., it need not do so. While it is logical that a machine that is malware free should remain malware free if all data coming into and out of the device over time is scanned, it doesn't hurt the system to maintain commercial virus scans in addition to the algorithms taught herein so that routine (nightly or weekly) scans are performed to ensure safe operation of a computer.

In many cases, a human authorization or intervention is taught herein. In many embodiments, a notice is provided to the user as a pop-up window or through another method. It is important to note that the software and hardware taught herein may be programmed to actually augment, add to, or change the html or xml code flowing into the browser of the system. For example, assume that the user requests viewing of a CNN news page on his browser. This page may contain 3 video links/windows, 4 advertisements, 10 pictures, or graphics, 12 other links and several text areas. The system may detect that malware is encountered if one video is watched, 1 advertisement is clicked or one of the 12 other links are followed. In these three cases where malware was detected, the program may change (either through adding, deleting, or modifying text, pictures, colors, or other indicia) the actual browser-displayed content to indicate to the user the presence of the malware, where it is located, what it's dangers are, corrective measures, and/or other notices. The browser may also be programmed to not allow the user to click or enable that malware infected content, at least until a human notice and override can be processed intelligently by the user.

It is also important to note that virus checking between peripherals and the main computer of a home system, a small/medium office system, or a larger network is getting more important. Even though software has found its way onto your computer in a safe malware-free state, it may still be contaminated from data from a raid storage array, a home media server, a gaming device, your periodically-connected laptop coming to and from the home or place of business, the Blackberry you sync to your computer, the various Bluetooth, WiFi, LAN, and WAN devices you interface to each day, the peripherals in your personal computer (sometimes they are separate computers themselves), a new graphics card you plug into your computer, and other items within your network, firewall, or personal/work area. Given viruses can get into peripherals and may be streamed into wireless communications in the future, such scanning between a computer and surrounding devices/peripherals is becoming more important.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A computing device comprising:
    network interface circuitry communicatively coupling the computing device to an Internet;
    computer memory; and
    processing circuitry coupled to the network interface circuitry and the computer memory, wherein the network interface circuitry, the computer memory, and the processing circuitry are configured to run a network browser that is configured to:
        allocate a safe portion of the computer memory to the network browser for quarantining malware infected data storage;
        receive data from the Internet;
        configure the safe portion of the computer memory to implement a level of isolation that varies dynamically over time as the data within the safe portion of the computer memory changes;
        scan the data for malware;
        determine that a first portion of the data is malware free;
        write the first portion of the data to an unprotected portion of the computer memory;
        determine that a second portion of the data contains malware;
        quarantine the second portion of the data by writing it to the safe portion of the computer memory;
        remove the malware from the second portion of the data;
        release the second portion of the data from the safe portion of the computer memory; and
        combine the first portion of the data with the second portion of the data.

2. The computing device of claim 1, wherein varying the level of isolation includes varying which resources have access to the data stored in the quarantine safe portion of the computer memory.

3. The computing device of claim 1 wherein the safe portion of the computer memory is isolated from a portion of operating system functionality.

4. The computing device of claim 1, further comprising the processing circuitry, in a differing operation, continuing the quarantining of the second portion of the data that contains malware for an extended period of time.

5. The computing device of claim 1, further comprising the processing circuitry allowing the second portion of the data to be released from the safe portion of the computer memory when a human user challenges the quarantine and authorizes the release of the second portion of the data from quarantine.

6. The computing device of claim 5, wherein the processing circuitry is configured to use the second portion of the data that was released from the safe portion of the computer memory, but wherein the second portion of the data is subject to special security processing while being used within the computing device.

7. The computing device of claim 1, further comprising the processing circuitry delivering the combined first portion of the data and the second portion of the data for use by the user.

8. The computing device of claim 1, wherein a level of isolation of the safe portion of computer memory varies over time based on a risk associated with the data quarantined in the safe portion of the computer memory.

9. The computing device of claim 1, wherein a level of isolation of the computer memory changes over time based on needs associated with access to the data quarantined in the safe portion of the computer memory.

10. The computing device of claim 1, wherein the data is downloaded from a trusted site that contains a signature associated with the data, wherein the computing device can process the signature to determine that the data is free of malware without having to perform local malware scanning.

11. The computing device of claim 1, wherein the malware is one or more of a Trojan horse, a virus, spyware, or adware, and wherein the malware is found by either scanning the data to detect certain patterns of data within the data or by allowing the data to function within the safe portion of the computer memory.

12. The computing device of claim 1, wherein the scan of the data for malware detection is performed as part of browser operations and also performed on data exchanged between peripheral devices associated with the computing device.

13. A method for processing data to detect and handle the presence of malware, the method comprising:
    allocating quarantine memory space of computer memory of a computer device to a web browser for malware infected data storage;
    configuring the quarantine memory space to implement a level of isolation that varies dynamically over time as the data within the quarantine memory space changes;
    initiating a data transfer from the computer device through a network interface circuitry during an upload or download operation requested by the web browser resident in memory;

receiving data by the web browser;

scanning the data for malware by the web browser;

determining that a first portion of the data is without malware by the web browser;

writing the first portion of the data to unprotected memory by the web browser;

determining that a second portion of the data includes malware by the web browser;

based on the determining, quarantining the second portion of the data into the quarantine memory space within the computer device by the web browser;

removing the malware from the second portion of the data;

releasing the second portion of the data from the quarantine memory space; and combining the first portion of the data with the second portion of the data.

14. The method of claim 13, further comprising:

providing a notice through the web browser to a user that malware was found and presenting a status and level of harm indication for the malware detected;

receiving input from the user regarding next steps to be taken in response to the detection of malware; and either continuing to quarantine, deleting, or providing to the user, the portion of data from the quarantine memory space after malware scanning is complete, wherein one of either continuing to quarantine, deleting, or providing the portion of data to the user is decided by the computing device in response to the input from the user.

15. The method of claim 14, wherein the step of providing a notice to a user involves embedding indicators in the browser content displayed to the user wherein the indicators identify for the user what content within the browser content is associated with malware.

16. The method of claim 13, wherein varying the level of isolation includes varying which resources have access to the data stored in the quarantine memory space.

17. The method of claim 13, wherein the quarantine memory space is isolated from a portion of operating system functionality.

18. The method of claim 13, further comprising continuing the quarantining of the second portion of the data that contains malware for an extended period of time.

19. The method of claim 13, wherein the malware is one or more of a Trojan horse, a virus, spyware, or adware, and wherein the malware is found by either scanning the data to detect certain patterns of data within the data or by allowing the data to function within the safe portion of the computer memory.

20. The method of claim 13, wherein the scan of the data for malware is performed as part of browser operations and also performed on data exchanged between peripheral devices associated with the computing device.

* * * * *